3,005,800
METHOD OF MALEINIZING PETROLEUM RESIN

Paul O. Powers, 321 Old Clairton Road, Pleasant Hills, Pa., and Herbert R. Herman, 2101 Walton Ave., Pittsburgh, Pa.
No Drawing. Filed Apr. 1, 1958, Ser. No. 725,518
8 Claims. (Cl. 260—78.4)

This invention relates to a maleic adduct of petroleum resin, and this application is a continuation-in-part of our application filed September 9, 1953, Serial No. 379,284, which parent application has been formally abandoned in favor of the instant continuation-in-part.

The petroleum resin comprised in the adduct is of specific composition comprising the polymers of conjugated diolefins and tertiary and secondary olefins occurring in a petroleum distillate produced by the deep cracking of petroleum stock. The petroleum distillate boils 90% below 125° C. and the polymerizable constituents comprised in it contain mainly 5, 6 and 7 carbon atoms. The resin is approximately devoid of polymerized aromatics and has a 50% aniline point above 100° C. It has a low acid number. This resin can be produced with a softening point within a wide range and is readily brought by steam distillation from a resin having a softening point of about 50° C. to 60° C. to a hard resin having a softening point of from about 70° C. to 100° C. The adduct can be produced from both the resin of higher softening point consisting in substantial entirety of the polymers of conjugated diolefins and readily polymerizable olefins and the softer resin which comprises in substantial proportion the polymers of the less readily polymerizable olefins. In either instance the softening point of the adduct is substantially higher than the softening point of the unmodified petroleum resin.

Although the initial petroleum distillate which provides the starting material for the specific resin under consideration comprises conjugated diolefins and olefinic unsaturates, the reactivity apparently indicated by that fact does not persist in the polymers of which the resin is composed. Initial attempts thermally to promote reaction between the resin and maleic anhydrides proved unsatisfactory, only a relatively small proportion of the maleic anhydride with respect to the quantity of the resin being included in the adduct. We have, however, discovered that by proper procedure and in the presence of a peroxide catalyst an adduct containing a very substantial proportion of maleic anhydride and which is otherwise possessed of desirable properties can be formed.

Early experiments produced an adduct containing no more than 10% maleic and in most instances the inclusion of the maleic anhydride was less than 10%; such adduct being neither water soluble nor readily soluble in ammonium hydroxide solutions. Results of such relatively small additions of maleic anhydride were in limited measure to raise the softening point of the resinous product with respect to that of the initial resin and in limited manner to provide in the adduct a reactivity lacking in the original product. Such earlier experiments were conducted in the absence of an effective catalyst and utilizing in the reaction mixture only a relatively small proportion of maleic anhydride.

Considering preferred procedure under our method of producing the adduct generally, a solution of the resin in an adequate quantity of organic solvent is first made. To this solution there is added an organic peroxide catalyst which is selected from the class possessed of a high stability and a high temperature of decomposition; more specifically, the class comprised in those organic peroxides having a temperature of decomposition of at least 120° C., such as tertiary butyl peroxide, tertiary butyl hydro-peroxide and others. It has been found that such peroxides provide the best catalysts for the reaction by which the adduct is formed. Of this class, we have found that tertiary butyl peroxide is the most advantageous, because of the necessary consideration of commercial availability as well as the production of the proper catalytic action. The maleic anhydride is added with stirring until completely dissolved. Also, it has been found necessary to include in the reaction mixture substantially more maleic than is actually reacted with the resin, the proportion of maleic included in the adduct depending very largely upon the quantity of that reagent which is included in the reaction mixture. Also because the maleic anhydride exerts a pronounced discoloring and sludging tendency in a reaction mixture with the above-identified petroleum resins, it is important that the resin be well dissolved in the solvent and that there is good agitation during the progress of the reaction. Thus, in order to obtain an adduct of the more striking properties, it is desirable to add the maleic anhydride in a quantity which includes in the reaction mixture approximately twice the proportion of the maleic which is expected to be included in the adduct. Also, it is desirable to remove the excess of unreacted maleic after completion of the reaction in order to obtain an adduct of high purity and for reasons of economy.

We have, however, discovered that the reaction may be promoted or forced by means of one of the catalysts of the aforementioned class and by including a large proportion of maleic anhydride in the reaction mixture. Under the most favorable conditions, we have been unable to react all the maleic anhydride which is included but find that up to a condition in which the weight of the maleic in the reaction mixture approaches the weight of the petroleum resin an increasing proportion of the maleic will be included in the adduct. Such proportional increment tapers off as there is an approach to equality in the relative weight of the resin and of the maleic anhydride in the reaction mixture. It may be considered that optimum conditions with respect to the reacted proportion of maleic anhydride and the total inclusion of the maleic in the adduct involve the inclusion of the maleic in the reaction mixture in a proportion of from about 20% to 70% the weight of the resin. Such inclusion in the reaction mixture gives an inclusion of maleic amounting to from about 10% to 30% of maleic with respect to the total weight of the adduct resin. It may be here noted that a proportional inclusion of maleic from about 15% upward gives an adduct having good solubility in ammonium hydroxide.

Returning to the consideration of the resin to which the adduct is made, the polymerization of the starting material in accordance with suitable practice gives a polymer solution yielding by steam distillation about 30% to 35% of a hard resin having a ball and ring softening point within the approximate range of 90° C. to 110° C. If the resin is permitted to contain lower polymers produced chiefly from the less readily polymerizable olefins included in the starting material by omitting extending steam distillation, a higher yield, up to about 40% the weight of the starting material, is obtainable. It is, however, a fact that the utility of such softer resin is much lower than the utility of the hard resin having higher softening point. We have additionally discovered that by reaction with maleic anhydride this softer resin will yield an adduct having a softening point which brings it within the range of greatly increased utility. In practice, therefore, it is in many instances desirable to react maleic anhydride with this higher yield of soft resin rather than with a lower yield of the harder resin.

A substantial quantity of the petroleum distillate starting material boiling 90% below 125° C. and containing about 23% of unpolymerizable aromatics, about 19% of conjugated dienes, about 23% of readily polymerizable olefins, and about 23% of less readily polymerizable olefins, with a negligible content of butadiene and isoprene in an order of less than 2% butadiene and less than 5% isoprene, was introduced into a reaction vessel without additional solvent. Aluminum chloride was added in a quantity equal to about 1% the weight of the petroleum distillate. The vessel was provided with mechanical agitation and means for external cooling and the mixture was maintained within the temperature range of 30° C. to 35° C. for a reaction period of about two hours. The reaction was drowned by adding about ½ its weight of water containing about 4% to 5% sulphuric acid. After drowning, the reacted liquid was given a thorough water wash and then was given an alkaline wash with a 10% water solution of $NaCO_3$, followed by a final water wash. The partially emulsified mixture of polymer solution and water was settled and the polymer solution was divided into two parts. One part was steam distilled for the recovery of 31.3% yield of hard resin having a softening point of 99.5° C. by the A.S.T.M. ball and ring softening point method D-36-26 and had a color of 11½ on the Gardner color scale. The solvent content of the other sample was distilled off but the residue was not steam distilled. The product was a 41.4% yield of a soft resin having a softening point of 60° C. by the above-noted ball and ring method of softening point determination. The resin had color 14 on the Gardner color scale.

The formation of the adduct may be exemplified as follows:

Example No. 1

A solution was made containing 1000 grams of the above-identified petroleum resin having a ball and ring softening point of 99.5° C. in 1000 grams of xylol. To this solution there was added 30 grams of tertiary butyl peroxide and 350 grams of maleic anhydride. The mixture was heated gradually with stirring until the maleic was all in solution. The reaction mixture then was heated to its boiling point of about 150° C. for reflux and reflux was continued for a reaction period of about 72 hours.

At the end of the reaction period and while holding the reacted mixture at 150° C., the reaction solution was decanted away from the sludge formed in the reaction. Carbon dioxide then was passed through the solution to blow out the xylol and the unreacted maleic anhydride. The mixture of xylol and maleic anhydride was recovered for use in subsequent reactions. The temperature of the still being brought to about 200° C., the passage of carbon dioxide was continued until most of the solvent and most of the maleic anhydride had been removed. Steam was then injected into the mass to remove the last portion of the maleic anhydride and some small amount of solvent and other of the lighter oils present in the resin.

About 1250 grams of adduct resin containing about 20% combined maleic anhydride was recovered. This product has a softening point of about 160° C. ball and ring and is color 6 on the coal tar scale. The product resin is readily soluble in 8% ammonium hydroxide at 85° C. to 90° C.. The solution made from this product is both translucent and transparent.

Example No. 2

A solution was made containing 1000 grams of the above-identified petroleum resin having a ball and ring softening point of about 60° C. in 1000 grams of xylol. To this solution there was added 30 grams of tertiary butyl peroxide and 300 grams of maleic anhydride. The mixture was heated gradually with stirring until the maleic was all in solution. The reaction mixture then was heated to its boiling point of about 150° C. for reflux and reflux was continued for a reaction period of about 32 hours.

At the end of the reaction period and while holding the reacted mixture at 150° C., the reaction solution was decanted away from the sludge formed in the reaction. Carbon dioxide then was passed through the solution to blow out the xylol and the unreacted maleic anhydride. The mixture of xylol and maleic anhydride was recovered for use in subsequent reactions. The still temperature being gradually raised to 230° C., the passage of carbon dioxide was continued until most of the solvent and most of the maleic anhydride had been removed. Steam was then injected into the mass to remove the last portion of the maleic anhydride and some small amount of the solvent and other of the lighter oils present in the resin.

About 1200 grams of adduct resin containing about 18% combined maleic anhydride was recovered. This product has a softening point of about 110° C. ball and ring and is color 5 on the coal tar scale. The product resin is readily soluble in 10% ammonium hydroxide at 85° C. to 90° C.. The solution made from this product is translucent and is almost as transparent as the solution made from the adduct produced in Example No. 1.

Example No. 3

A solution was made containing 1000 grams of the above-identified petroleum resin having a ball and ring softening point of 99.5° C. in 1000 grams of xylol. To this solution there was added 35 grams of tertiary butyl peroxide and 650 grams of maleic anhydride. The mixture was heated gradually with stirring until the maleic was all in solution. The reaction mixture then was heated to its boiling point of about 150° C. for reflux and reflux was continued for a reaction period of about 40 hours.

At the end of the reaction period and while holding the reacted mixture at 150° C., the reaction solution was decanted away from the sludge formed in the reaction. Carbon dioxide then was passed through the solution to blow out the xylol and the unreacted maleic anhydride. The mixture of xylol and maleic anhydride was recovered for use in subsequent reactions. The temperature of the still being brought to about 200° C., the passage of carbon dioxide was continued until most of the solvent and most of the maleic anhydride had been removed. Steam was then injected into the mass to remove the last portion of the maleic anhydride and some small amount of solvent and other of the lighter oils present in the resin.

About 1400 grams of the adduct resin containing about 28% combined maleic anhydride was recovered. This product has a softening point of about 180° C. ball and ring and is color 6 on the coal tar scale. The product resin is readily soluble in 8% ammonium hydroxide at 85° C. to 90° C.. The solution made from this product is both translucent and transparent.

Example No. 4

A solution was made containing 1000 grams of the above-identified petroleum resin having a ball and ring softening point of about 60° C. in 5000 grams of xylol. To this solution was added 35 grams of tertiary butyl peroxide and 500 grams of maleic anhydride. The mixture was heated gradually with stirring until the maleic was all in solution. The reaction mixture then was heated to its boiling point of about 150° C. for reflux and reflux was continued for a reaction period of about 48 hours.

At the end of the reaction period and while holding the reacted mixture at 150° C., the reaction solution was decanted away from the sludge formed in the reaction. Carbon dioxide was passed through the solution to blow out the xylol and the unreacted maleic anhydride. The mixture of xylol and maleic anhydride was recovered for use in subsequent reactions. The temperature of the still being brought above 150° C., the passage of carbon dioxide was continued until most of the solvent and most of the maleic anhydride had been removed. Steam was then injected into the mass to remove the last portion of the maleic anhydride and some small mount of solvent and other of the lighter oils present in the resin.

About 1300 grams of adduct resin containing about

23% combined maelic anhydride was recovered. This product has a softening point of about 115° C. ball and ring and is color 5 on the coal tar scale. The product resin is readily soluble in 8% ammonium hydroxide at 85° C. to 90° C. The solution made from this product is both translucent and transparent.

*Example No. 5*

This example illustrates the result of utilizing conditions of less severity in the formation of the adduct, to give a product having a lower maleic anhydride content.

A solution was made containing 1000 grams of the above-identified petroluem resin having a ball and ring softening point of 99.5° C. in 1000 grams of a mixed aromatic solvent. To this solvent was added 30 grams of tertiary butyl peroxide and 200 grams of maleic anhydride. The mixture was heated gradually with stirring until the maleic was all in solution. The reaction mixture then was heated to its boiling point of about 150° C. for reflux and reflux was continued for a reaction period of about 10 hours.

At the end of the reaction period and while holding the reacted mixture at 150° C., the reaction solution was decanted away from the sludge formed in the reaction. Carbon dioxide was passed through the solution to blow out the solvent and unreacted maleic anhydride. The mixture of solvent and maleic anhydride was recovered for use in subsequent reactions. The temperature of the still being gradually raised to 230° C., the passage of carbon dioxide was continued until most of the solvent and most of the maleic anhydride had been removed. Steam was then injected into the mass to remove the last portion of the maleic anhydride and some small amount of the solvent and other of the lighter oils present in the resin.

About 1125 grams of adduct resin containing about 10% combined maleic anhydride was recovered. This product has a softening point of about 140° C. ball and ring and is color 6 on the coal tar scale. The product resin is soluble in strong ammonia, such as a 30% to 40% ammonium hydroxide solution. The solution made from this product is translucent, but is not transparent, as is the case with the adducts comprising a higher maleic content.

It is apparent from the above discussion and examples that the formation of the maleic adduct with the disclosed petroleum resin gives a product having a softening point very much higher than that of the initial resin. The hard, high melting adduct which is ammonia soluble is of enhanced utility in a number of compositions and is particularly useful in emulsion waxes in which the combination of hardness and ammonia solubility is of great importance. As above exemplified, it is possible to regulate the hardness of the adduct resin in accordance with the quantity of maleic anhydride which is reacted with the petroleum resin so that the indicated procedures and modifications give products within a wide range of softening point. Also, whereas the petroleum resin itself is a relatively inert material, the adduct by addition of the maleic is reacted with a greater variety of other materials to provide products for use in or as coating compositions and for numerous other purposes.

It will be noted that the disclosed procedure by which large proportions of maleic anhydride can be included in the adduct involves a reaction of the maleic anyhydride with the petroleum resin in solution and under the stimulus provided by a peroxide catalyst. It must be understood that, although the employment of tertiary butyl peroxide alone has been exemplified hereinbefore, we have found that other organic peroxides which are highly stable and have a high temperature of decomposition give closely similar results and are usable in place of the tertiary butyl peroxide without substantial difference in the properties of the adduct or in the quantity of maleic anhydride required in the process or in the other conditions under which the adduct is formed. However, as explained hereinbefore, the tertiary butyl peroxide is the most commercially practical catalyst having a high stability and a temperature of decomposition in excess of 120° C.

It also is to be understood that maleic acid and fumaric acid both can be caused to react as maleic anhydride to form the adduct, maleic acid first dehydrating to maleic anhydride for the reaction and fumaric acid undergoing both isomerization and hehydration preparatory to reacting with the resin. For simplicity of expression, it therefore will be considered that those two substances partake in the ultimate reaction in the form of maleic anhydride and that the use of all three is intended by referring to the actual reaction of maleic anhydride with the petroleum resin to form the adduct. There are, however, certain less desirable incidents to the use of fumaric acid involved in bringing it into condition for reaction. Thus, the relatively high temperature required for isomerization precludes the use of any of the hydrocarbon solvents which are readily available in quantity. In the case of fumaric acid, therefore, the reaction is conducted by a hot melt procedure rather than in solution as above described with reference to the addition of maleic anhydride initially to the reaction mixture. Such hot melt processes utilizing fumaric acid as one of the starting materials can be exemplified as follows:

*Example No. 6*

A reaction mixture was made up by introducing 1000 grams of the above-identified petroleum resin, 200 grams of fumaric acid, and 30 grams of tertiary dibutyl peroxide into a reaction vessel equipped with stirring apparatus. The temperature of this reaction mixture was raised to 220° C. and was held at that temperature with agitation for 10 hours. At the end of that reaction period the excess of maleic anhydride was steamed from the batch at a temperature of about 250° C. and the fused adduct was decanted from the sludge in the vessel.

The product was an adduct amounting to about 1100 grams and containing about 9% of maleic anhydride. The melting point of the adduct was about 130° C. ball and ring. Although most of the sludge formed in the reaction adhered to the sides or bottom of the vessel, the color of the adduct was about 15 on the coal tar scale as compared with color 5 or 6 on that scale as described with respect to the product described in previous examples.

It may be explained that maleic acid may be reacted in solution in the same manner as when maleic anhydride is the initially added reagent, because of the fact that merely dehydration and not isomerization, as in the case of fumaric acid, are essential in preparation for the actual reaction. It also will be understood that the same hot melt process employed on the batch containing fumaric acid also may be employed in the case of maleic acid and maleic anhydride when those materials are included initially in the reaction mixture. Because of the fact, however, that the use of a commercial organic solvent, such as any of the aromatic hydrocarbon solvents of adequately high boiling point, gives an adduct of lighter color and because recovery of unreacted maleic anhydride in excess of that consumed in the reaction is readily effected in that procedure, a reaction conducted in solution is greatly to be preferred.

I claim as my invention:

1. The method of making an adduct resin which is readily soluble in 8% ammonium hydroxide solution and having a ball and ring softening point from 40° C. to 80° C. higher than the ball and ring softening point of from 50° C. to 100° C. of the original resin of which the adduct is formed, said original resin being the resinous polymerization product of a cracked petroleum distillate boiling 90% below 125° C., consisting essentially of conjugated dienes and olefins containing 5, 6, and 7 carbon atoms and containing less than 2% butadiene and less than 5% isoprene, comprising the steps of (a) preparing a solution of approximately 1000 parts of the said original resin and 1000 to 5000 parts of aromatic hydrocarbon solvent therefor, (b) adding to the said solution from 30 to 35 parts of tertiary butyl peroxide and from 300 to 600 parts of maleic anhydride, (c) gradually heating and stirring the mixture thus comprised until substantially all of the said maleic anhydride is in solution, (d) heating the said mixture to its boiling point of approximately 150° C. for reflux, and (e) continuing reflux until the maleic anhydride has been included in the adduct in a proportion of at least 10% of the total weight of the said adduct resin.

2. The adduct resin produced in accordance with the procedure of claim 1.

3. The method of making an adduct resin which is readily soluble in 8% ammonium hydroxide solution and having a ball and ring softening point from 40° C. to 80° C. higher than the ball and ring softening point of from 50° C. to 100° C. of the original resin of which the adduct is formed, said original resin being the resinous polymerization product of a cracked petroleum distillate boiling 90% below 125° C., consisting essentially of conjugated dienes and olefins containing 5, 6, and 7 carbon atoms and containing less than 2% butadiene and less than 5% isoprene, comprising the steps of (a) preparing a solution of approximately 1000 parts of the said original resin and 1000 to 5000 parts of aromatic hydrocarbon solvent therefor, (b) adding to the said solution from 30 to 35 parts of tertiary butyl peroxide and from 300 to 600 parts of maleic anhydride, (c) gradually heating and stirring the mixture thus comprised until substantially all of the said maleic anhydride is in solution, (d) heating the said mixture to its boiling point of approximately 150° C. for reflux, (e) continuing reflux until the maleic anhydride has been included in the adduct in a proportion of at least 10% of the total weight of the said adduct resin, and (f) decanting the solution formed by the reaction away from the sludge formed in the reaction.

4. The adduct resin produced in accordance with the procedure of claim 3.

5. The method of making an adduct resin which is readily soluble in 8% ammonium hydroxide solution and having a ball and ring softening point from 40° C. to 80° C. higher than the ball and ring softening point of from 50° C. to 100° C. of the original resin of which the adduct is formed, said original resin being the resinous polymerization product of a cracked petroleum distillate boiling 90% below 125° C., consisting essentially of conjugated dienes and olefins containing 5, 6, and 7 carbon atoms and containing less than 2% butadiene and less than 5% isoprene, comprising the steps of (a) preparing a solution of approximately 1000 parts of the said original resin and 1000 to 5000 parts of aromatic hydrocarbon solvent therefor, (b) adding to the said solution from 30 to 35 parts of tertiary butyl peroxide and from 300 to 600 parts of maleic anhydride, (c) gradually heating and stirring the mixture thus comprised until substantially all of the said maleic anhydride is in solution, (d) heating the said mixture to its boiling point of approximately 150° C. for reflux, (e) continuing reflux until the maleic anhydride has been included in the adduct in a proportion of at least 10% of the total weight of the said adduct resin, (f) decanting the solution formed by the reaction away from the sludge formed in the reaction, and (g) passing carbon dioxide through the said reaction solution while maintaining the temperature of the said solution at from 150° C. to 230° C. to remove the majority of the aromatic hydrocarbon solvent and unreacted maleic anhydride.

6. The adduct resin produced in accordance with the procedure of claim 5.

7. The method of making an adduct resin which is readily soluble in 8% ammonium hydroxide solution and having a ball and ring softening point from 40° C. to 80° C. higher than the ball and ring softening point of from 50° C. to 100° C. of the original resin of which the adduct is formed, said original resin being the resinous polymerization product of a cracked petroleum distillate boiling 90% below 125° C., consisting essentially of conjugated dienes and olefins containing 5, 6, and 7 carbon atoms and containing less than 2% butadiene and less than 5% isoprene, comprising the steps of (a) preparing a solution of aproximately 1000 parts of the said original resin and 1000 to 5000 parts of aromatic hydrocarbon solvent therefor, (b) adding to the said solution from 30 to 35 parts of tertiary butyl peroxide and from 300 to 600 parts of maleic anhydride, (c) gradually heating and stirring the mixture thus comprised until substantially all of the said maleic anhydride is in solution, (d) heating the said mixture to its boiling point of approximately 150° C. for reflux, (e) continuing reflux until the maleic anhydride has been included in the adduct in a proportion of at least 10% of the total weight of the said adduct resin, (f) decanting the solution formed by the reaction away from the sludge formed in the reaction, (g) passing carbon dioxide through the said reaction solution while maintaining the temperature of the said solution at from 150° C. to 230° C. to remove the majority of the aromatic hydrocarbon solvent and unreacted maleic anhydride, and (h) injecting steam into the mass to remove the remainder of the aromatic hydrocarbon solvent and unreacted maleic anhydride along with certain of the lighter oils present in the resin.

8. The adduct resin produced in accordance with the procedure of claim 7.

References Cited in the file of this patent

UNITED STATES PATENTS

| | | |
|---|---|---|
| 2,142,980 | Huijser et al. | Jan. 3, 1939 |
| 2,634,256 | Sparks et al. | Apr. 7, 1953 |
| 2,656,334 | D'Alelio | Oct. 20, 1953 |
| 2,662,874 | Brown | Dec. 15, 1953 |
| 2,824,859 | Fasce | Feb. 25, 1958 |
| 2,871,137 | Aldridge et al. | Jan. 27, 1959 |